ions on Ihis page follow.

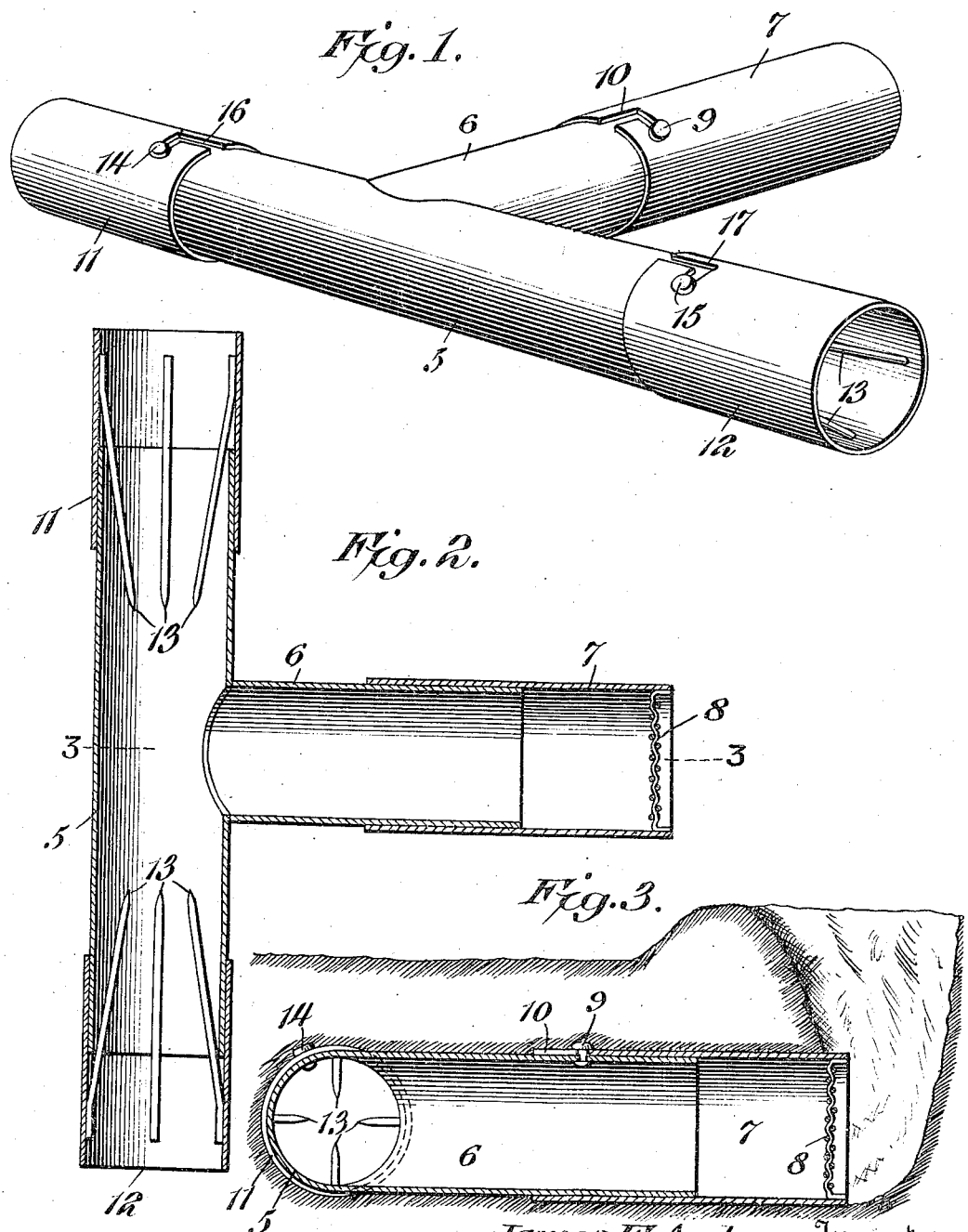

UNITED STATES PATENT OFFICE.

JAMES FRANKLIN ANDREWS, OF ROSALIA, WASHINGTON.

ANIMAL-TRAP.

1,011,304.

Specification of Letters Patent.   Patented Dec. 12, 1911.

Application filed June 5, 1911. Serial No. 631,332.

*To all whom it may concern:*

Be it known that I, JAMES F. ANDREWS, a citizen of the United States, residing at Rosalia, in the county of Whitman and State of Washington, have invented a new and useful Animal-Trap, of which the following is a specification.

The invention relates to animal traps, and has for its primary object to provide a trap which is particularly adapted for the catching of pocket gophers, an animal whose habits are to mine runways under ground and make its home in the same.

Another object is to provide a trap adapted to be positioned in a gopher runway and provided with an opening, adapted to extend to the side of the main runway and open into the atmosphere, to admit light to the said runway and trap and thus lure the animal into the trap.

My invention consists in certain details of construction and combination of parts all of which will be more fully set forth, specifically pointed out in the appended claim, and illustrated in the accompanying drawing, in which, Figure 1 is a perspective view of the device. Fig. 2 is a horizontal sectional view of the device, showing the arrangement of the various parts. Fig. 3 is a section on the line 3—3 of Fig. 2, showing the trap positioned in the ground ready for use.

My invention comprises a metallic tube 5 of any suitable size or length and open at both ends. The tube 5 is provided in one of its sides and midway of its length with an opening of any suitable size, around which opening is secured in any suitable manner as by solder a tube 6, said tube extending at approximately right angles to the first-mentioned tube; the entire structure being substantially T-shaped in plan view. The outer end of tube 6 is encircled by a sleeve 7 of a diameter slightly larger than that of tube 6, this sleeve being partially closed at its outer end by means of a heavy mesh wire screen 8 secured to the end thereof in any suitable manner. In order that the sleeve will not become displaced when placed over tube 6, a projecting pin 9 is provided on tube 6, which is adapted to enter the bayonet slot 10 in the inner edge of sleeve 7 and hold the two parts together.

Sleeves 11 and 12 encircle opposite ends of the main tube 5 and prevent the animal after once entering from escaping from the tube, the sleeves being duplicate in construction. The sleeves 11 each comprise a metallic band of a diameter slightly larger than tube 5 and provided on its interior with a plurality of inwardly converging spring metal points or spikes 13, the outer ends of which are secured to the interior of the sleeve in any suitable manner as by solder. The spring points are adapted when the sleeves are in position on the ends of the tube 5 to project inwardly toward the center of the tube, and when an animal enters the tube, to prevent it from either backing out the way it entered, or going out at the opposite end. The tube 5 is provided adjacent either end with upwardly projecting pins 14, 15 which are adapted to enter the bayonet slots 16, 17 on the inner edges of the sleeves 11, 12, and detachably secure the said sleeves in place.

The operation and use of said device is as follows: It is the habit of the pocket gopher to make a series of underground passages, and in constructing the same, the soil taken out to provide the passages must be disposed of. To accomplish this, the gopher constructs short side channels, the ends of which open at the surface of the ground, and through these outlet openings the soil is discharged forming a mound at each branch. After the soil is discharged, the side channel is closed by soil, as it is the gopher's habit to live in darkness. In setting the trap, it is necessary to locate a mound, trace from the mound the main channel and after opening the two channels, insert the part 5 of the trap in the main channel and the part 6 in the branch channel. As a result the end of the tube which is partially closed by the netting 8 will extend into the branch channel and to the opening in the center of the mound. It will thus be seen that a light-admitting opening has been provided in the main channel. As soon as discovered by the gopher, he makes it his business to close the same and in doing so the gopher collects the earth and pushes it along before him and upon entering one end of the tube 5, the presence of the spikes 13 will be unnoticed by the gopher, because of the amount of earth directly ahead of him, until it is too late to retreat, and he will be compelled to proceed into the trap. After the gopher has been caught and it is desired to release him from the trap, the bayonet slot on the sleeve at any opening of the tube may be disconnected from the pin, the sleeve removed and the animal ejected from that opening. It will be apparent from the above description that the animal may enter the trap from either end of the main channel, that after entering he cannot escape from any of the tubes, and when it is desired to dispose of the animal he may be ejected through any tube by simply removing the sleeve or collar.

The entire structure is preferably of a dark color, so as not to attract the attention of the animal, and is either constructed of a rust-proof material or is coated with a rust-proof compound to prevent the device from rusting.

Having thus fully described my invention, what I claim as new and desire to secure by Letters Patent, is:—

A gopher trap adapted to be buried in the ground, comprising a main tube to be located in the main runway of a gopher and a branch tube to be located in the lateral gopher runway, said main tube being open at both ends and having inwardly converging rigid spikes at said ends, and said branch tube being open at both ends and communicating with the main tube at an intermediate point of its length and rigid therewith and arranged at an angle thereto, and a sleeve mounted upon the outer end of the branch tube and provided with a screen to form a barrier for the gopher and yet permit said branch tube to afford means for lighting the interior of the main tube.

In testimony, that I claim the foregoing as my own, I have hereto affixed my signature in the presence of two witnesses.

JAMES FRANKLIN ANDREWS.

Witnesses:
  LLEWELLYN T. BROCKWAY,
  WILL C. PERRY.